US005640680A

United States Patent [19]

Ishida et al.

[11] Patent Number: 5,640,680
[45] Date of Patent: Jun. 17, 1997

[54] RADIO COMMUNICATION APPARATUS, RADIO COMMUNICATION SYSTEM, AND METHOD OF EXPANDING TERMINAL FOR USE IN RADIO COMMUNICATION SYSTEM

[75] Inventors: Shinjiro Ishida, Iruma; Hironobu Hoashi, Ome; Kazuyasu Yamane, Hamura, all of Japan

[73] Assignee: Casio Computer Co., Ltd., Tokyo, Japan

[21] Appl. No.: 362,819

[22] Filed: Dec. 22, 1994

[30] Foreign Application Priority Data

Dec. 28, 1993 [JP] Japan ................................. 5-336831
Oct. 13, 1994 [JP] Japan ................................. 6-247850

[51] Int. Cl.⁶ .......................................................... H04Q 7/00
[52] U.S. Cl. .................................... 455/34.1; 455/54.2
[58] Field of Search .............................. 455/54.1, 54.2, 455/56.1, 88, 89, 90; 379/58, 61, 60, 62

[56] References Cited

U.S. PATENT DOCUMENTS

| 4,553,263 | 11/1985 | Smith et al. | 455/34.1 |
|---|---|---|---|
| 4,864,599 | 9/1989 | Saegusa et al. | 379/58 |
| 4,878,238 | 10/1989 | Rash et al. | 379/58 |
| 5,155,860 | 10/1992 | McClure | 455/90 |
| 5,210,787 | 5/1993 | Hayes et al. | 379/60 |
| 5,423,035 | 6/1995 | Diaz et al. | 455/54.2 |
| 5,438,608 | 8/1995 | Kojima | 379/62 |

Primary Examiner—Edward F. Urban
Attorney, Agent, or Firm—Frishauf, Holtz, Goodman, Langer & Chick

[57] ABSTRACT

A radio communication system has a terminal which enables radio communication through a base station, and service condition of a radio communication terminal to register is registered together when the radio communication terminal is registered.

12 Claims, 15 Drawing Sheets

REGISTERED CONDITION MEMORY

| CS-ID | TERMINAL NUMBER | | | | GROUP TERMINAL NUMBER |
|---|---|---|---|---|---|
| | F1 | F2 | F3 | F4 | |

FIG. 7

TERMINAL DATA MEMORY

| TERMINAL NUMBER | PS-ID | | | |
|---|---|---|---|---|
| | F1 | F2 | F3 | F4 |

FIG. 6

TERMINAL 5,640,680

RADIO COMMUNICATION APPARATUS, RADIO COMMUNICATION SYSTEM, AND METHOD OF EXPANDING TERMINAL FOR USE IN RADIO COMMUNICATION SYSTEM

BACKGROUND OF THE INVENTION

1. Field of the Invention

The present invention relates to a radio communication system and a method of expanding a terminal with respect to a base station of the radio communication system.

2. Description of the Related Art

Presently, there is a radio communication system capable of communicating with remote terminals through a base station connected to a communication network. An example of this communication system is a PHS (Personal Handyphone System) which is to be put into practice in Japan. The specification of the PHS is standardized in RCR STD-28. The PHS has a base station installed in an indoor space (e.g., a house or an office) or in an outdoor space (e.g., a public space). Each of the indoor and outdoor base stations can be connected to terminals through radio communication.

Further, the standard defines transceiver communication by which direct conversation can be made between terminals of like transceivers. Transceiver communication is allowed for only those terminals which have the same base identification information (in particular, indoor terminals).

SUMMARY OF THE INVENTION

An object of the present invention is, therefore, to provide a radio communication apparatus, a radio communication system, and a method of expanding a terminal for use in the radio communication system, which are more convenient than conventional systems and methods.

In order to solve the above problems, according to an aspect of the present invention, there is provided a method of installing a new terminal in a radio communication system having a base station and a terminal, the method comprising the steps of: registering service condition together with base station identification data into the terminals; and registering service condition together with terminal identification data into the base station.

According to another aspect of the present invention, there is provided a method of causing a base station to conduct in when a new terminal is installed in a radio communication system having a base station and a terminal, the method comprising the steps of: comparing recitation data supplied from the new terminal with recitation data of the base station itself, and storing service condition of the new terminal on condition that the recitation data from the new terminal comply with the recitation data of the base station; and comparing contents of a connection request inputted from the new terminal with the service condition stored in the memory means, and controlling connection of the new terminal on the basis of comparison results.

According to still another aspect of the present invention, there is provided a radio communication system having a base station and a terminal, capable of installing a new terminal, the base station comprising: means for storing service condition of the new terminal; means for comparing contents of a connection request inputted from the new terminal with the service condition stored in the storing means; and means for controlling transmission connection of the new terminal, on the basis of comparison results of the comparing means.

According to still another aspect of the present invention, there is provided a radio communication system having a base station and a terminal, capable of installing a new terminal, the base station comprising: first comparing means for comparing recitation data supplied from the new terminal with recitation data of the base station itself; means for storing service condition of the new terminal on condition that the recitation data of the new terminal complies with the recitation data of the base station; second comparing means for comparing contents of a connection request inputted from the new terminal with service condition stored in the storing means; and means for controlling connection of the new terminal on the basis of comparison results of the second comparison means.

According to still another aspect of the present invention, there is provided a method of installing a new terminal in a radio communication system having a base station and a terminal, the method comprising the steps of: transmitting a system code of the base station stored in the terminal from a terminal which has already been registered into the base station; and receiving the system code of the base station transmitted from the terminal which has already been registered in the base station by the new terminal and registering it in the new terminal.

According to still another aspect of the present invention, there is provided a radio communication system having a base station and a terminal, the base station comprising: first storing means for storing a dummy system code; and means for transmitting a dummy system code stored in the memory means to a terminal; and the terminal comprising; means for receiving a dummy system code transmitted from the transmission means of the base station; and second storing means for storing the dummy system code received by the receiving means.

According to still another aspect of the present invention, there is provided a radio communication apparatus for making radio communication with a base station, comprising a memory arranged to be capable of being detachably attached to the radio communication apparatus and storing a dummy system code, and direct communication with another radio communication apparatus is made on the basis of the dummy system code stored in the memory when the memory is attached to the radio communication apparatus.

In the present invention, even if terminals previously have the same base station identification information, transceiver communication can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a figure showing a memory structure of a terminal data memory used in an indoor base station;

FIG. 7 is a figure showing a memory structure of a registered condition memory;

DETAILED DESCRIPTION OF THE PREFERRED EMBODIMENTS

Embodiments of the present invention will be explained hereinafter with reference to the drawings. With respect to the following embodiments, explanation will be directed to examples applied to a PHS (Personal Handyphone System) which is considered to be put into practice in Japan. This PHS has a radio base station (which will be referred to as a base station) provided at an indoor space and a radio personal station connected thereto by radio communication. Further, the PHS is characterized in that the radio personal station is linked with a public radio base station (which will be referred to as a cell station). In addition, if radio personal stations have identification data of the same base station, the radio personal stations can communicate with each other without passing through the base station.

EMBODIMENT 1

Figure 1:
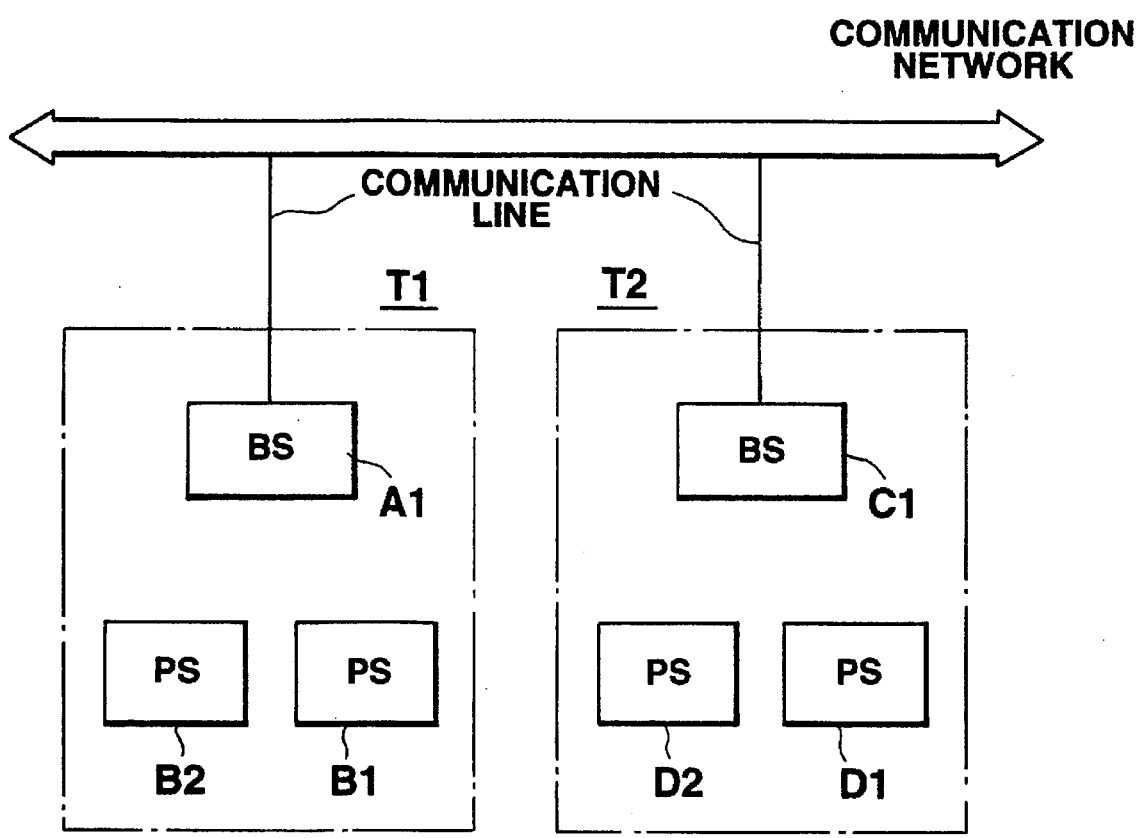
FIG. 1 is a diagram showing a connection state where a radio communication system according to a first embodiment of the present invention is used.

FIG. 1 shows a schematic structure where a plurality of radio personal stations (which will be referred to as personal stations, hereinafter) are used in a first embodiment. In FIG. 1, reference T1 denotes a radio communication set. The radio communication set T1, for example, includes one base station (BS) A1 and two personal stations (PS) B1 and B2. Further, the base station A1 is connected to a communication network through a communication line L. PSTN, ISDN, or the like is known as the communication network.

Meanwhile, another radio communication set T2 is connected to the communication network through the communication line as in the same manner as above. This radio communication set T2, for example, has one base station C1 and two terminals D1 and D2.

Further, when communication is made from a terminal B1 or B2 to another terminal connected to a communication network, the identification number (e.g., telephone number) of a party to communicate is sent to the communication network, to call the party. When a personal station of a party receives a call signal from a terminal of another party through a base station A1, the personal station responds to the call signal, thereby enabling communication. In the same way, when communication is made between the terminals D1 and D2 in the radio communication set T2, communication is made through the base station C1.

Furthermore, when communication is made between personal stations, there may be both cases where the communication is made through a base station and where the communication is directly made between the personal stations. For example, in the radio communication set T1, when communication is made between personal stations through a base station A1, a party calls another personal station B1 (or B2) from a personal station B2 (or B1) through the base station A1, and the former personal station responds to this call. In addition, when direct communication is made between personal stations without relaying the base station, a predetermined frequency assigned to direction communication is used to call, from one of the personal stations, to another thereof on the condition that each personal station has identification data of the same base station, and direct communication is started when the another personal station responds to this call.

Figure 2:
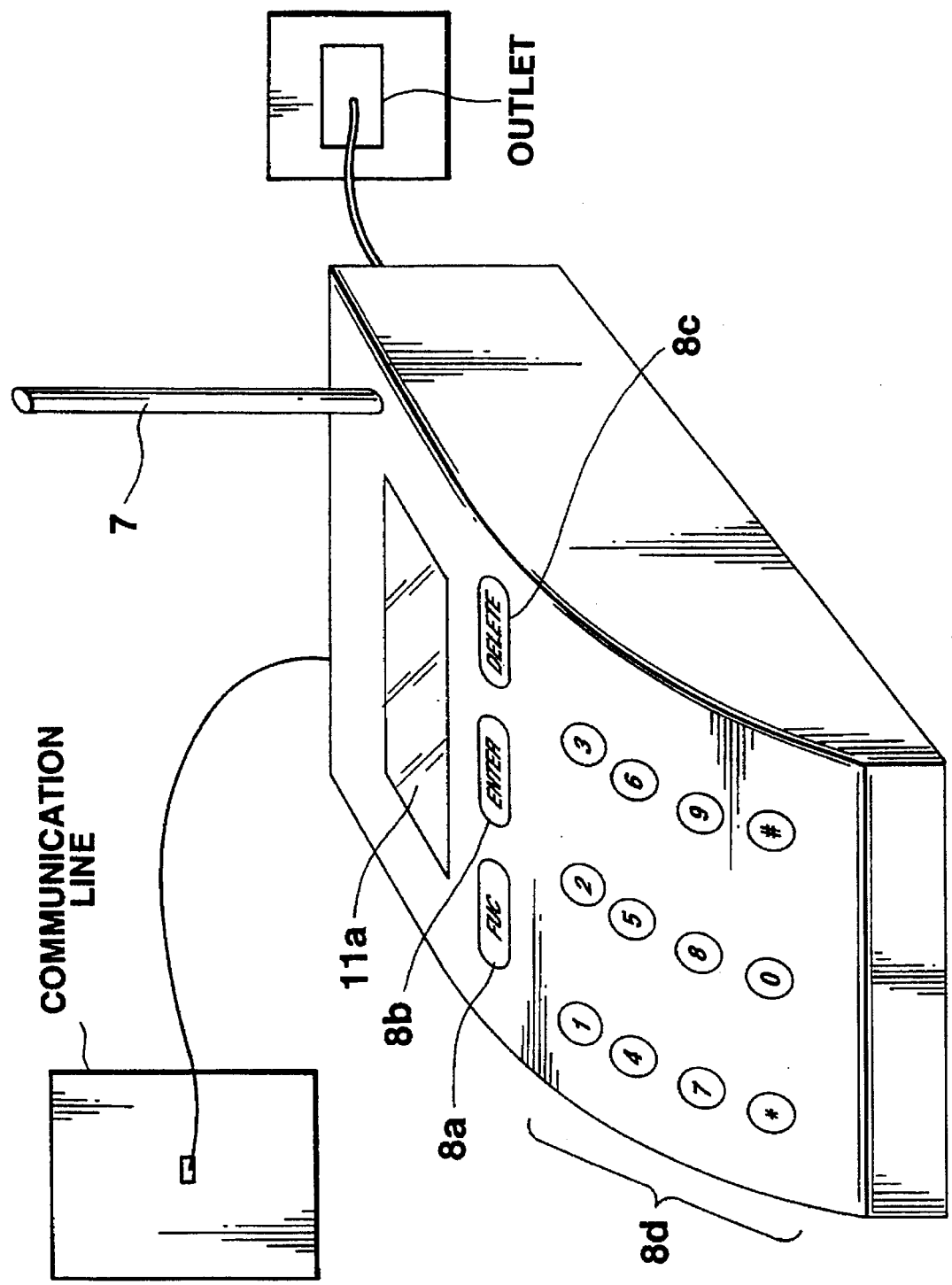
FIG. 2 is a sketch drawing showing an indoor base station in the radio communication system according to the first embodiment.

FIG. 2 is a sketch drawing of the base station A1 (C1). The base station A1 is connected to a communication network through a communication line, and power is supplied through an outlet. Reference numeral 7 denotes an antenna used to communicate a personal station. Reference numeral 11a denotes a display of a display unit 11 for displaying various information. The display 11a displays, for example, input guidances in a registration mode. Reference 8a denotes a function key used when operation is switched into various modes, and reference 8b denotes a setting key for indicating setting of data. Reference 8c denotes a delete key for ordering deletion of data, and reference 8d denotes numerical keys for inputting memory numbers and terminal numbers.

Figure 3:
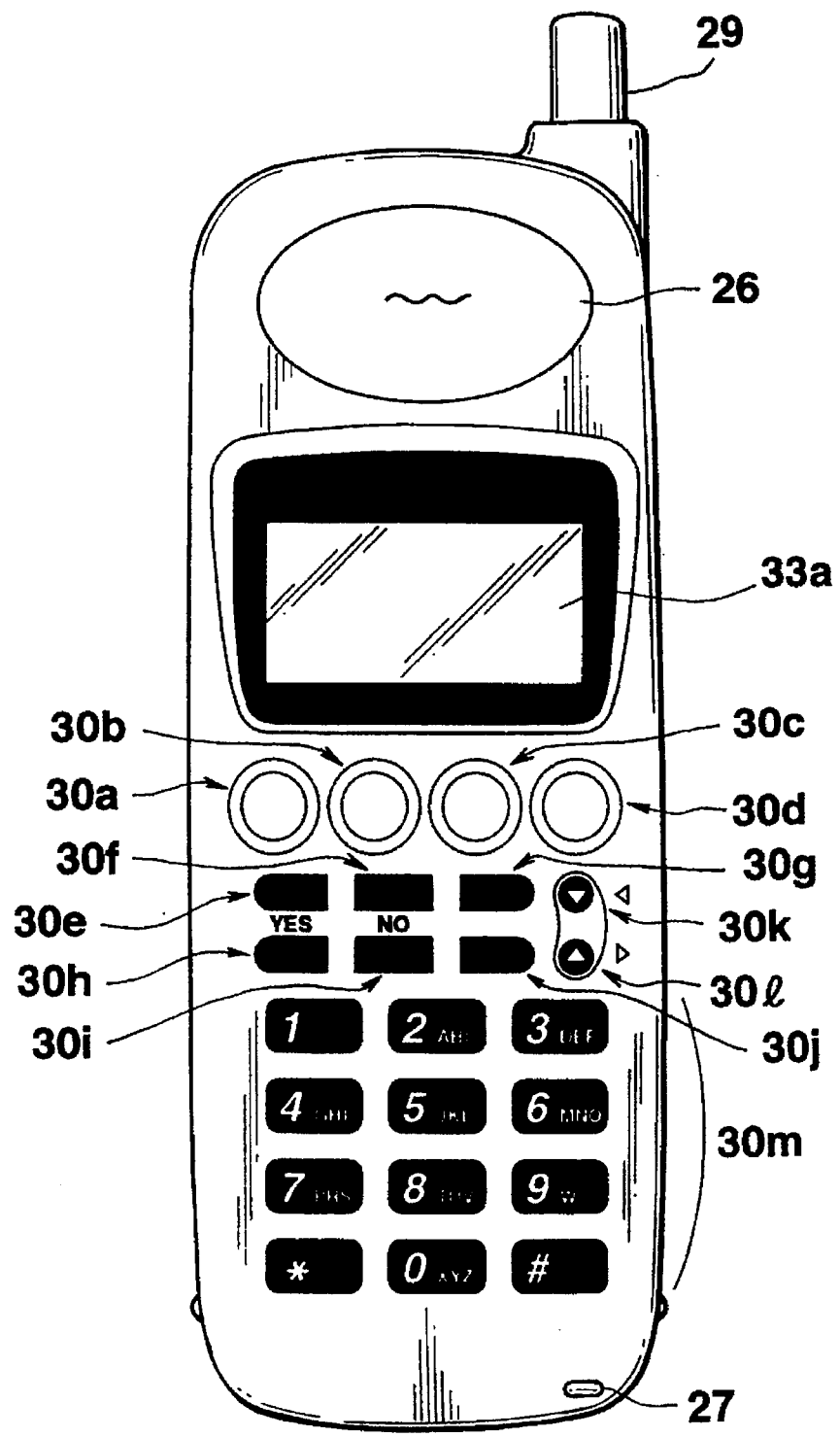
FIG. 3 is a sketch drawing showing a radio communication terminal in the radio communication system according to the first embodiment.

FIG. 3 is a sketch drawing of a personal station B1 (which is the same type as the personal stations B2, D1, and D2). Reference 29 denotes an antenna for transmitting/receiving a radio wave. Reference 26 denotes a speaker for outputting sounds. Reference 27 denotes a microphone for taking-in sounds. Reference 33a denotes a display for displaying various data. Reference 30a denotes an off-hook key which orders receipt and transmission, and reference 30b denotes an on-hook key for ordering a break of communication. Reference 30c denotes a transceiver key for ordering extension communication or transceiver communication, and reference 30d denotes a reservation key for indicating a reservation of communication.

Further, reference 30e denotes a telephone directory key by which operation is switched into a mode for searching telephone directory data stored in the apparatus, and reference 30f denotes a mode key for ordering various modes. Reference 30g denotes a re-dial key for re-dialing a telephone number which has been dialed before, with only one key. Reference 30h denotes a set key for setting various data. Reference 30i denotes a deletion key for deleting data, and reference 30j denoted a switching key used for a so-called catch phone. References 30k and 30l denote keys for instructing scroll of data and an increase or decrease in sound volume, and reference 30m denote dial keys and alphabet keys.

Figure 4:
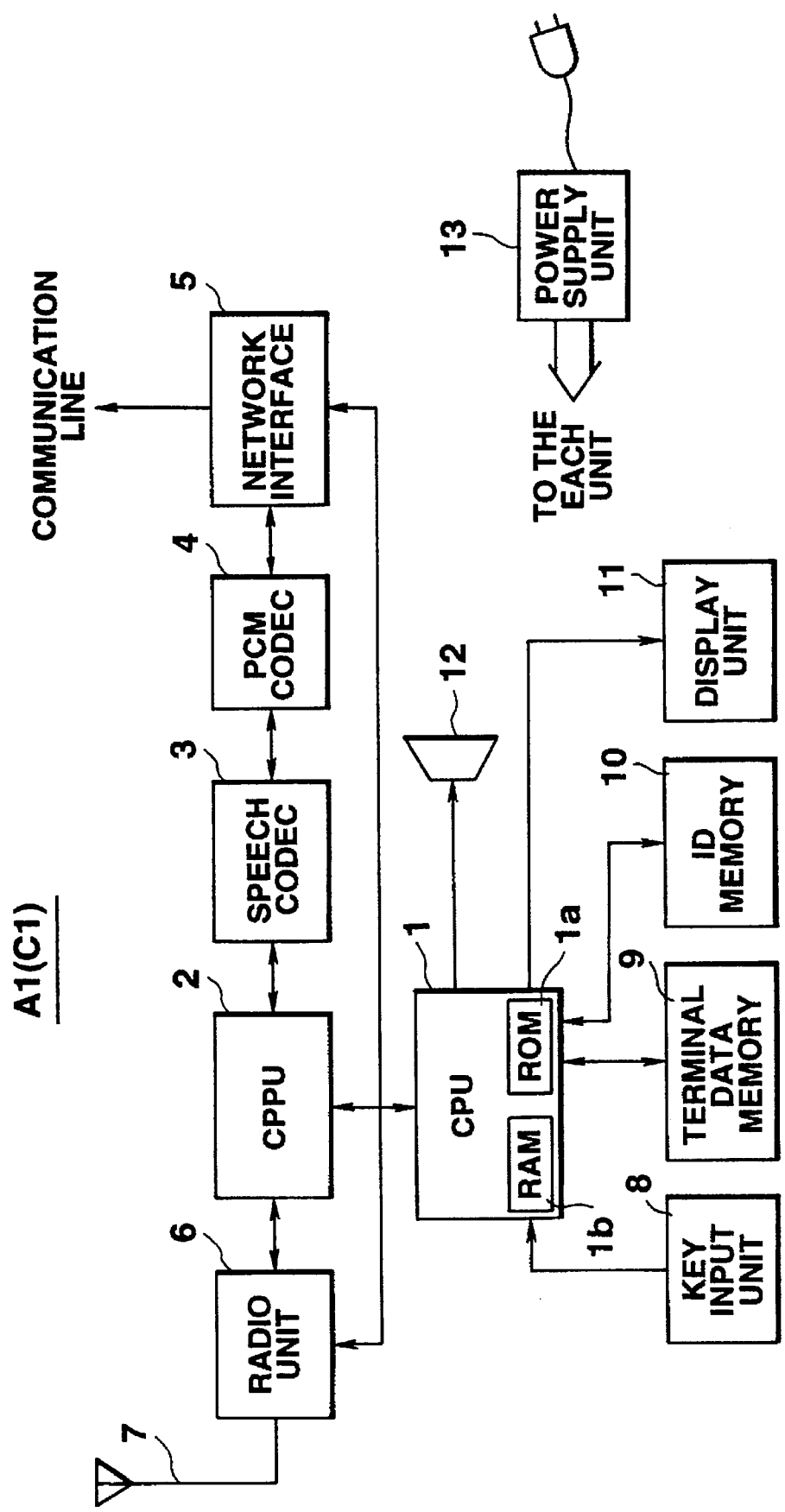
FIG. 4 is a block diagram showing the circuit configuration of an indoor base station in the radio communication system according to the first embodiment.

FIG. 4 shows a block structure of a base station A1 (C1) in the radio communication set T1 (T2). In FIG. 4, reference 1 denotes a CPU 1, and this CPU 1 is connected with a communication procedure processing unit (which will be referred to as a CPPU hereinafter) 2 which is used for performing control when communication with personal stations B1 and/or B2 is made.

The CPU1 uses a RAM1b to perform the entire operation control of the base station A1 on the basis of programs in the ROM1a, and performs first and second collation processing, memory processing and connection control processing. For example, when a personal station D1 of a different radio communication set T2 is registered in the base station A1, cipher data supplied from the personal station D1 of the different radio communication set T2 is checked with cipher data of itself (e.g., the first check processing). When cipher data of the personal station D1 complies with cipher data of itself by this check processing, the service condition of the personal station D1 will be stored into the terminal data memory 9 which will be described below.

Further, when transmission is made from a personal station through the base station A1, request of transmission (e.g., outside lines and extensions lines) inputted from the personal station are checked with registration condition stored in the terminal data memory 9 (e.g., the second check processing). On the basis of checking results, transmission connections and the likes are controlled.

The CPPU 2 is connected with a speech codec 3 and a radio unit 6. The radio unit 6 is connected with an antenna 7. The radio unit 6 modulates and demodulates signals transmitted to and received from a personal station through the antenna 7, and frequency conversion and burst control are performed on the basis of control signals from the CPU 1. The CPPU 2 performs TDMA (Time Division Multiple Access) processing. Specifically, control signals or sound signals are extracted at predetermined timings from receive signals from the radio unit 6. In addition, sound signals from the speech codec 3 or the CPU 1 are inserted into transmission signals at predetermined timings, and are outputted to the radio unit 6. Further, connection/disconnection of a radio communication line is performed under control of the CPU1.

The speech codec 3 is connected with a PCM codec 4. A network interface 5 is connected through the PCM codec 4, and a communication line is connected to a network interface 5. The speech codec 3 performs compression/extension processing of digital data. Specifically, when data from a personal station is received, ADPCM sound signals (e.g., compressed sound signals) sent from the CPPU 2 are decoded (extended) and PCM sound signals are outputted to the PCM codec 4. In addition, when signals are sent to a personal station, PCM sound signals sent from the PCM codec 4 are encoded (compressed) and ADPCM sound signals are outputted to the CPPU 2.

In the PCM codec 4, analogue/digital conversion processing is performed. That is, when signals from the personal station are received, PCM sound signals are subjected to digital/analogue conversion and are outputted to the network interface 5. In addition, when signals are transmitted to the personal station, analogue sound signals are analogue/digital converted and PCM sound signals are outputted to the speech codec 3.

The network interface 5 comprises a signal arrival detection circuit, a dial pulse control circuit, a speech network, a DTMF signal generator circuit, and the like. The network interface 5 is connected to a connection line, like a normal telephone, and control such as detection of an arrival of a signal, dial transmission, communication, and the like is performed. That is, when signals are received through a communication line, a connection state (line connection/line disconnection) is controlled on the basis of control signals from the CPU 1, and when a line is connected thereby enabling a communication state, analogue sound signals inputted through the communication line are sent to the PCM codec 4, and simultaneously, analogue sound signals are outputted through the communication line.

Meanwhile, the CPU 1 is connected with a key input unit 8, a terminal data memory 9, an ID memory 10, a display unit 11, and a ringer 12, in addition to the CPPU 2 stated above.

The key input unit 8 is used when expansion of a personal station is set.

Data concerning a terminal number and identification data (PS-ID) of a personal station additionally attached to the base station A1 and data concerning the terminal condition (e.g., F1 to F4 which will be described later) and the likes of the additionally attached personal station are stored into a terminal data memory 9. Specifically, as shown in FIG. 6, terminal numbers, PS-IDs, and terminal condition of the personal stations (B1 and B2) registered in the base station A1 as well as identification data (CS-ID=SYS-ID+SUB-ID) of the base station A1 are stored into the ID memory 10. In this embodiment, although the terminal data memory 9 and the ID memory 10 are constructed independently from each other, they may be formed of one memory.

In the display unit 11, a cipher number, a terminal number, and the likes inputted from the key input unit 8 are displayed on the display unit 11 when expansion of a terminal is set, and the display unit 11 comprises a display 11a, a driving circuit, and the likes. A ringer 12 generates a sound notifying arrival of a signal when the signal arrival detection circuit of the network interface 5 detects an arrival of a signal from an external device.

In addition, the power supply unit 13 is connected to an outlet, and supplies power to respective sections.

Figure 5:
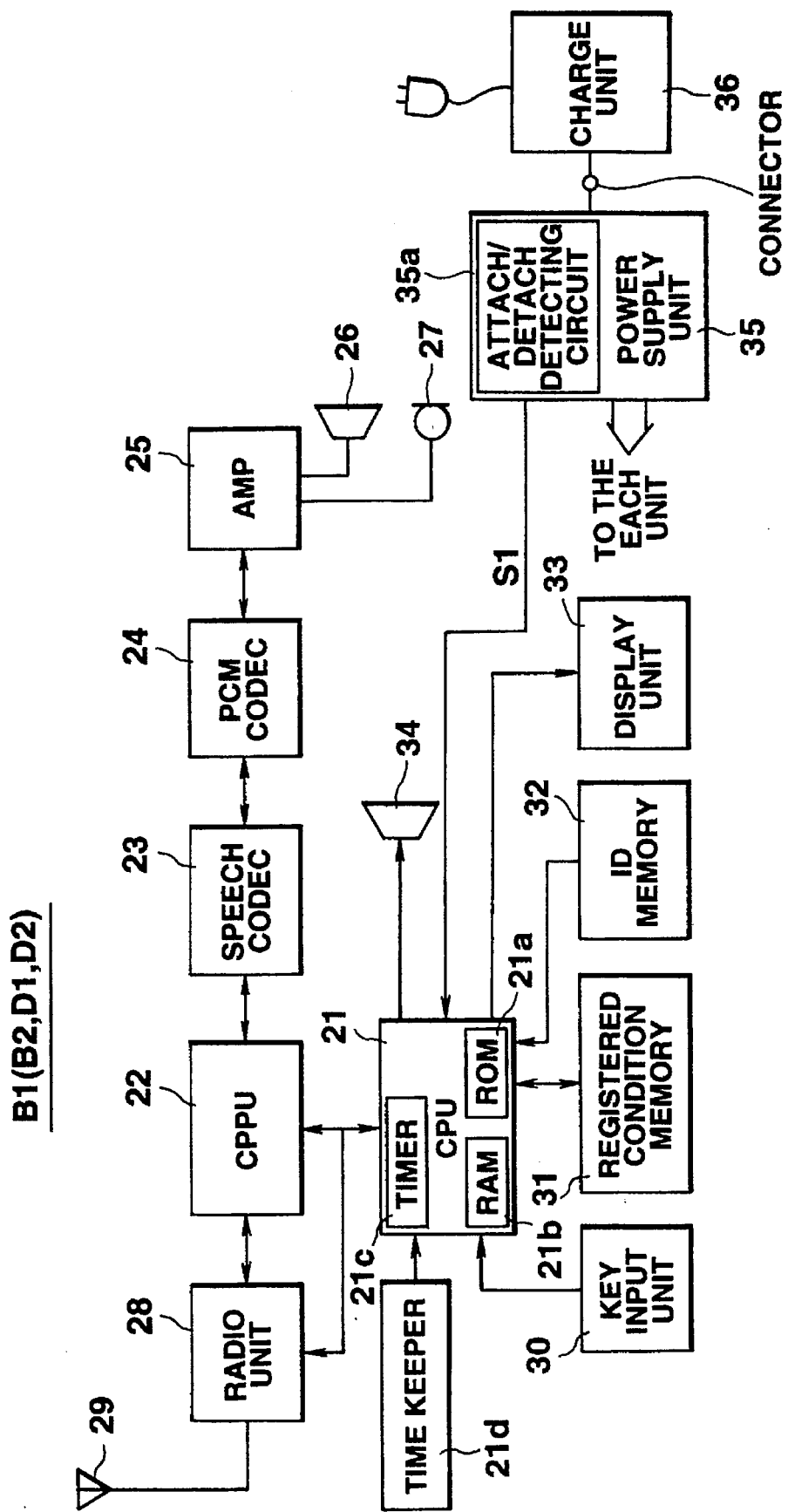
FIG. 5 is a block diagram showing the circuit configuration of a radio communication terminal in the radio communication system according to the first embodiment.

FIG. 5 is a diagram showing the block structure of a terminal B1 (B2, D1, D2) in the radio communication set T1 (T2). In FIG. 5, reference numeral 21 denotes a CPU which uses a RAM 21b on the basis of programs in the ROM 21a to perform the entire operation control. The CPU 21 is connected with a communication procedure processing unit (which will be referred to as a CPPU) used when control of communication with a base station is performed. In addition, the CPU 21 has a timer 21c and counts for a predetermined time period. The CPU 21 is connected with a time keeper 21d for calculating date and hour.

The CPPU 22 is connected with a speech codec 23 and a radio unit 28. This radio unit 28 is connected with an antenna 29, and performs frequency conversion, modulation, and demodulation on signals transmitted and received through an antenna 29.

The speech codec 23 is connected with an AMP 25 through a PCM codec 24, and the AMP 25 is connected with a speaker 26 and a microphone 27. The speech codec 23 performs compression/extension processing. When signals from the base station A1 are received, the speech codec 23 demodulates (or extends) ADPCM sound signals sent from the CPPU 22 into PCM sound signals. Further, when signals are transmitted to the base station A1, PCM sound signals sent from the PCM codec 24 are encoded (or compressed) into ADPCM sound signals and are outputted to the CPPU 22.

The PCM codec 24 performs analogue/digital conversion processing. When signals from the base station are received, PCM sound signals sent from the speech codec 23 are digital/analogue converted and then outputted. The analogue sound signals thus outputted are amplified by the AMP 25, and are then outputted from the speaker 26. In addition, when signals are transmitted to the base station, the analogue sound signals inputted from the microphone 7 are amplified by the AMP 25 and are outputted to the speech codec 23 after being analogue/digital converted by the PCM codec 24.

Meanwhile, the CPU 21 is connected with a key input unit 30, a registered condition memory 31, an ID memory 32, a display unit 33 and a ringer 34, in addition to the CPU 22 stated above.

The key input unit 30 has a function key, a dial key, and an on-hook/off-hook key (see references 30a to 30m in FIG. 3), and is used to input a telephone number of an opposite party and to set expansion of a terminal.

Data concerning a personal station additionally installed is stored in the registered condition memory 31. Specifically, as shown in FIG. 7, the registered condition memory 31 stores identification data of a base station (CS-ID=SYS-ID+SUB-ID), a terminal number of a terminal, terminal condition (i.e., F1 to F4 which will be described later), and terminal numbers (i.e., group terminal numbers) of other terminals which belong to a CS-ID. Further, the ID memory 32 stores identification data (PS-ID) of a previously registered personal station B1 itself and identification data (CS-ID=SYS-ID+SUB-ID) of previously depending base station A1. In addition, in this embodiment, although a registered condition memory 31 and an ID memory 32 are constructed independently from each other, these memories may be formed by one memory.

The display unit 33 displays a cipher number and a terminal number which are inputted from a key input unit 30 when the display unit 33 sets expansion of a terminal, and a telephone number of an opposite party. The ringer 34 generates a signal arrival sound upon receipt of a call signal from the base station A1.

The power supply unit 35 internally includes a secondary battery and supplies power to respective portions. This power supply unit 35 is connected with a charge unit 36 for charging the secondary battery. In addition, the power supply unit 35 includes an attach/detach detecting circuit 35a for detecting attachment or detachment of the charge unit 36, and outputs an attach/detach detection signal S1 therefrom to a CPU 21.

Further, the circuit configurations of the base station C1 and personal station D1 of the radio communication set T2 are the same as those shown in FIGS. 4 and 5, and explanation thereof will be omitted herefrom.

Registration Operation

Figure 8:
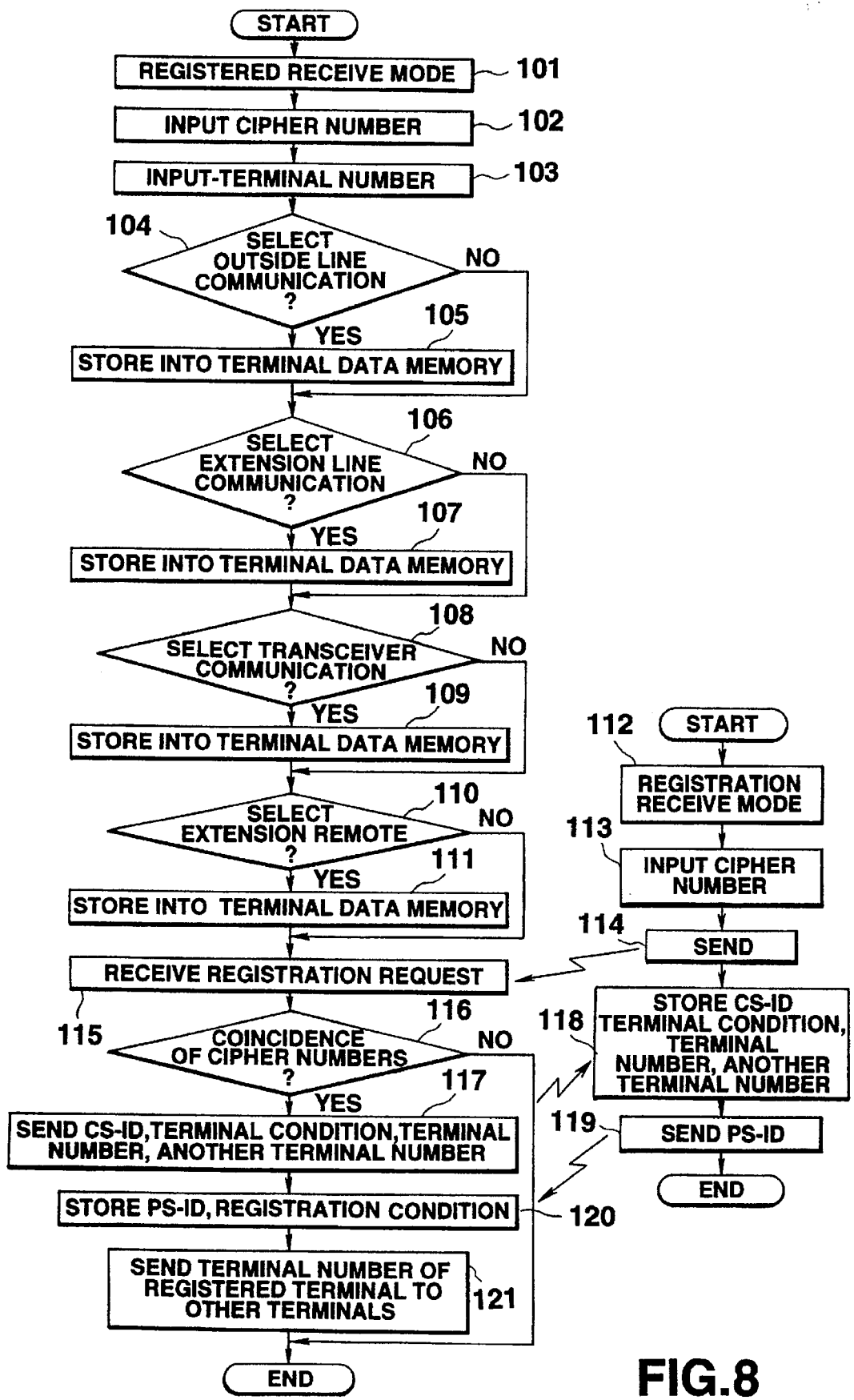
FIG. 8 is a flow chart showing a procedure for radio communication terminal registration in the radio communication system according to the first embodiment.
Figure 9:
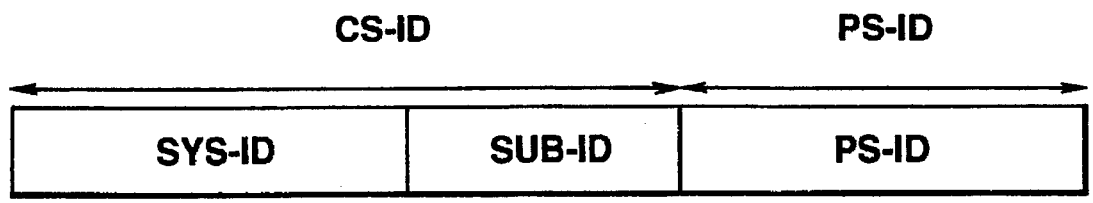
FIG. 9 is a figure showing the structure of an identification data used in communication between a base station and a personal station.

In the next, operation of the radio communication set constructed as shown in the above will be explained with reference to flow charts shown in FIGS. 8 and 9. This embodiment shows a case where registration is made into the base station A1 of the radio communication set T1 while the personal station D2 is kept depending on the base station C1 of the radio communication set T2.

At first, to make the personal station D2 of the radio communication set T2 depend on the base station A1 of the radio communication set T1, a procedure of registration into the side of the base station A1 will be explained on the basis of FIG. 8.

When a user performs registration into the base station A1, a function key 8a of a key input unit 8 is pressed down by the user so that the base station A1 is set into a registration receive mode (step 101). The display 11a thereby displays an indication that the base station is in a registration mode and simultaneously displays an indication suggesting an input of a cipher number. On the basis of the indications, the user inputs, for example, a cipher number of three figures by means of a number key 8d of the key input unit 8, and then, the cipher number is stored into a RAM 1b of the base station A1 (step 102).

Further, the display 11a displays an indication suggesting an input of the terminal number of a personal station to be registered. The terminal number of the personal station D2 (e.g., the third personal station in this embodiment) from the terminal numbers of the personal stations belonging to the base station A1 of the personal station D2 to be registered is inputted and the terminal number thus inputted is stored into a predetermined region of the terminal data memory 9 (refer to FIG. 6) in a step 103.

In the next, a user makes selection from four functions, i.e., an outside line function (flag F1) of transmitting signals to the outside through the base station, an extension function (flag F2) of allowing personal stations to communicating with each other through the base station, a transceiver function (flag F3) of allowing personal stations to directly communicate with each other without passing through the base station, and a remote control function (flag 4) of remote-controlling another personal station or the base station itself through the base station (refer to FIG. 6).

Further, functions which can be selected are not limited to the above four functions, but it is possible to make an arrangement such that a special receiving function can be selected.

At first, the CPU 1 displays, on the display unit 11, a message asking whether or not use of an outside line communication function should be permitted, thereby suggesting the user to set whether the outside line communication function should be permitted or inhibited. Upon detection of a response which permits use of the function is received from the user, i.e., when permission for the outside line communication is selected by a set key 8b of the key input unit 8 (step 104), a flag is marked on the flag F1 of the terminal data memory 9 (step 105). When the setting processing for permitting or inhibiting use of the outside line communication function is completed, the CPU 1 displays, on the display unit 11, a message suggesting whether or not use of the extension communication function should be permitted, thereby suggesting the user so as to perform setting a response to the message. When the CPU 1 detects a response from a user which permits use of the function, i.e., when permission for extension line communication is selected by the set key 8b of the key input unit 8 (step 106), a flag is made so as to stand on a flag F2 of the terminal data memory 9 (step 107).

In addition, the CPU 1 displays, on the display unit 11, a message as to whether use of a transceiver communication function should be permitted or not. When the CPU 1 detects a response from a user which permits use of the function, i.e., when permission for use of the transceiver communication function is selected by the set key 8 of the key input unit 8 (step 108), a flag is made so as to stand on a flag F3 of the terminal data memory 9 (step 109).

Further, the CPU 1 displays, on the display unit 11, a message as to whether use of an extension remote function should be permitted or not. When the CPU 1 detects a response from a user which permits use of the function, i.e., when permission for use of the extension remote function is selected by the set key 8b of the key input unit 8 (step 110), a flag is made so as to stand on a flag F4 of the terminal data memory 9 (step 111). In addition, when non permission is inputted by the deletion key 8c of the key input unit 8 in each of the above steps 104,106,108, and 110, the flag is not made so as to stand on the flag.

In this state, the operation mode changes into a stand-by mode where a registration requirement is waited for.

Thereafter, an user performs registration operation in the side of the personal station D2.

At first, a user presses down a mode key 30f of the key input unit 30, thereby to bring the personal station into a registration receive mode (step 112). In this state, a message suggesting an input of the same cipher number as the cipher number inputted in the step 102 is displayed on the display 33a of the display unit 33. When the user inputs a cipher number of, for example, three figures by means of a dial key 30m of the key input unit 30 in response to the display (step 113), the CPU 21 writes the cipher number into registration request message data and sends the data to the base station A1 from an antenna 28 through a CPPU 22 and a radio unit 28 (step 114). Normal message data is formed as identification data consisting of a CS-ID (SYS-ID and SUB-ID) and a PS-ID, as shown in FIG. 9. However, the identification data in the registration request data is transmitted with a cipher number being written in an area of the CS-ID.

Further, when the CPU 1 in the base station A1 receives registration request message data from the personal station D2 through the antenna 7, radio unit 6, and the CPPU 2 (step 115), the cipher number written in the registration request message data thus received is extracted therefrom, and the cipher number thus received is checked with the cipher number stored in the RAM 1b (step 116). In case where it is found by the checking that both cipher numbers do not comply with each other, a procedure of registering the personal station D2 into the base station A1 is completed.

On the other hand, when both the cipher numbers comply with each other, the following data is sent from the antenna 7 to the personal station D2 through the CPPU 2 and the radio unit 6 (step 117).

1) CS-ID of the base station A1 stored in the ID memory 10
2) Terminal condition stored in the terminal data memory 9 in the above steps 104 to 111
3) Terminal number
4) Other terminal numbers (group terminal number) which belong to the base station A1 and are stored in the terminal data memory 9 and in the ID memory 10

Through the antenna 29, radio unit 28, and CPPU 22, the CPU 21 of the personal station D2 receives CS-ID, terminal condition, terminal numbers, and group terminal numbers which are transmitted from the base station A1 (step 118), and stores them into corresponding areas in the registered condition memory 31, respectively. Further, the CPU 21 reads out a PS-ID of the personal station D2 itself, and transmits the PS-ID to the base station A1 (step 119).

Through the antenna 7, radio unit 6, and the CPPU 2, the CPU 1 of the base station A1 receives the PS-ID, and stores the PS-ID into the terminal data memory 9 so as to comply with the terminal number and the terminal condition which has already been stored (step 120). Then, the CPU 1 transmits the terminal number of the personal station thus registered, to another personal station which has already been belonging to the base station A1 (step 121). The another personal station stores the terminal number registered in this way, into an area of the registered condition memory 31 for group terminal numbers.

In this manner, operation for registering the personal station D2 into the base station A1.

Transmission Operation

In the next, a procedure for outside line transmission from a personal station in a radio communication set thus registered will be explained with reference to FIG. 10. In this case, transmission of an outside line and an extension line from regular personal stations B1 and B2 in the radio communication set T1 is well known, and explanation thereof will therefore be omitted herefrom.

Figure 10:
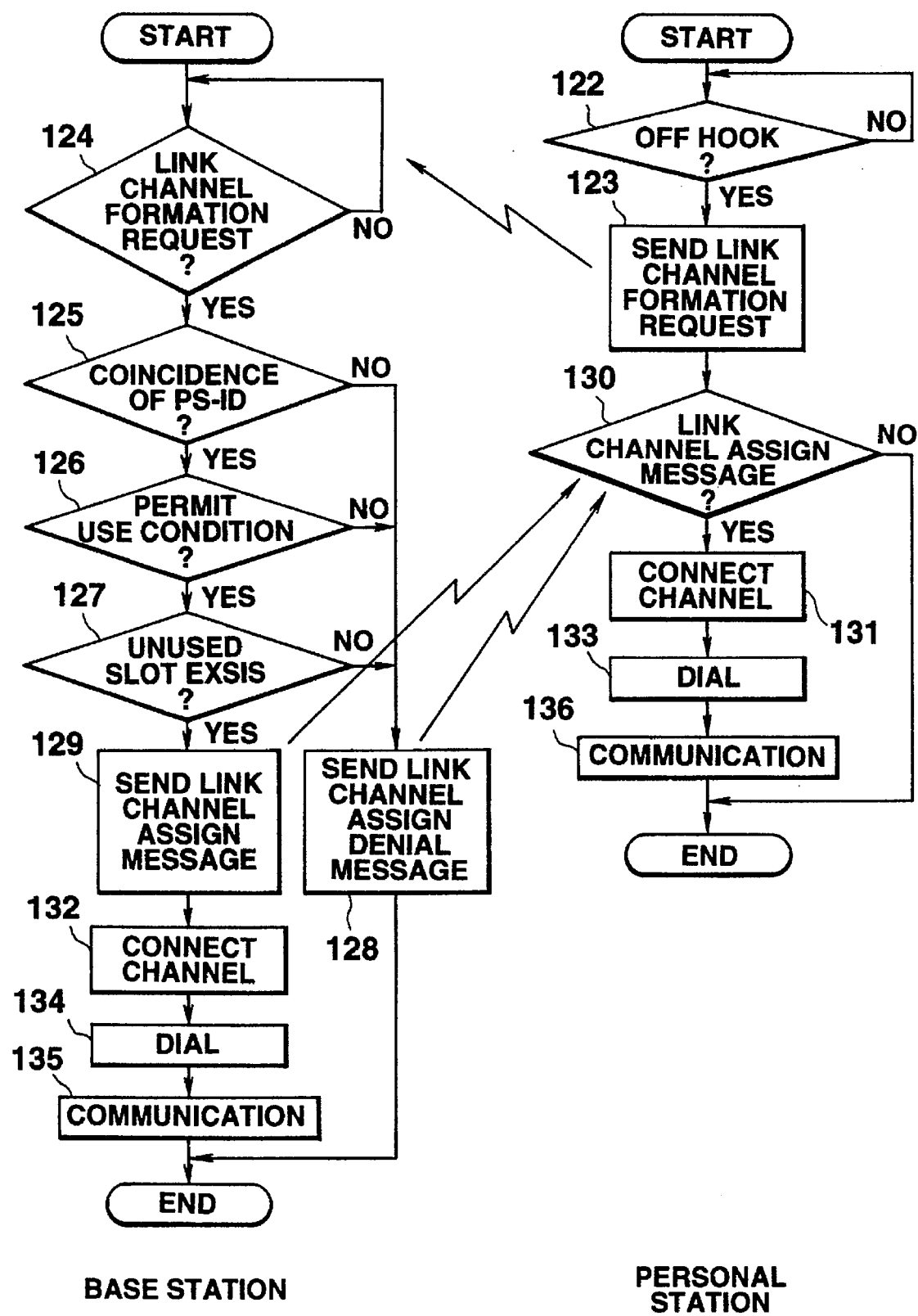
FIG. 10 is a flow chart showing a procedure for transmission from a radio communication terminal in the radio communication system according to the first embodiment.

FIG. 10 shows flow charts of operations in the base station A1 and personal station D2. Here, explanation will be made to a case where transmission of an outside line is performed through the base station A1 by the personal station D2 of the radio communication set T2 which belongs to the base station A1 of the radio communication set T1 in accordance with registration processing as stated above. Normally, on the base of the CS-ID stored in the ID memory 32, the personal station D2 is connected to a base station having the CS-ID. However, the present case relates to a case where the station D2 cannot be linked with the base station having the CS-ID stored in the ID memory 32, but can be linked with the CS-ID stored in the registered condition memory 31.

At first, when an off-hook key 30a of the key input unit 30 of the personal station D2 is operated and an outside line transmission request is generated (step 122), the PS-ID of the station D2 itself and the CS-ID of a designated base station A1 are respectively read out, from the ID memory 32 and the registered condition memory 31, with respect to the base station A1 which currently receives control signals, and link channel formation request message data is prepared and transmitted (step 123).

The base station A1 receives the link channel formation request message data (step 124) and checks the PS-ID in link channel formation request message with the PS-ID registered in the terminal data memory 9 or ID memory 10 (step 125). When it is determined in the step 125 that the registration has been made, checking is made as to whether or not the flag F1 of the terminal condition registered with respect to the PS-ID (personal station D2) is permitted. When the terminal condition is permitted in this step 126, the CPU 1 requests search of an empty slot with respect to the CPPU 2 (step 127). When an empty slot exists, a link-channel assign message is sent to a personal station D2 so as to move into the empty slot (step 129).

In addition, when both of the PS-IDs do not comply with each other, service condition are not permitted, or an empty slot does not exist in any of steps 125,126, and 127, a link channel denial message is transmitted (step 128).

The personal station D2 receives these messages (step 130) and if a received message is a link channel assign message, normal outside line transmission processing is performed. Specifically, the base station A1 and the personal station D2 respectively control their own radio units 6 and 28 so as to comply with an assigned empty slot, and simultaneously, an indication showing the outside line transmission enable state is outputted to the display unit 33. In addition, a channel link is formed thereby forming a channel (steps 131 and 132), an audible sound notifying the outside line transmission enable state (i.e., a transmission sound) is outputted from the speaker 26.

Further, when a dial number is inputted by a user through dial keys 30m of the key input unit 30 of the personal station D2, the dial number is transmitted to the base station A1 (step 133). When the base station A1 receives the dial number and sends the number to a communication channel network L through the network interface 5 (step 134). When an opposite party responds to the dial number by ON-hooking, communication can be started (steps 135 and 136). In addition, when a link channel assign denial message is received in the step 130, outside line processing is not carried out.

When communication is once started, sound signals of a user inputted by a microphone 27 of the personal station D2 are amplified by an AMP 25 and analogue signals of the user are analogue/digital-converted in a PCM codec 24. PCM sound signals thus converted are sent to a speech codec 23, are compressed (or encoded) into ADPCM sound signals, and are then outputted to the CPPU 22. The ADPCM sound signals are formatted into compressed sound signals in the CPPU 22 and are frequency-converted so as to have a modulated and assigned channel frequency. The signals are then transmitted to the base station A1 from the antenna 29.

In the base station A1, communication signals received by the antenna 7 are frequency-converted and demodulated so as to have a middle frequency in the radio unit 6. In the CPPU 2, signals for one slot are extracted from the demodulated communication signals, and compressed sound signals are outputted to the speech codec 3. These compressed sound signals are extended (modulated) in the speech codec 3 and the PCM sound signals are digital/analogue-converted by the PCM codec 4, so that analogue sound signals are outputted to a communication channel network L through the network interface 5.

A procedure for transmission from the personal station D2 has been explained above, while a procedure for receiving signals in the personal station D2 is executed in the order reversal to the order of the above steps, so that received sound signals are finally outputted as sounds from the speaker 26.

Note that although the above explanation has been made to an outside line transmission of the personal station D2, the same operation as above is performed for extension line transmission and extension line remote transmission.

Supposing that the terminal condition of the personal station D2 permits only transceiver communication (i.e., permits only the flag F3), a link channel assign denial message is sent from the base station A1 in the step 128. The personal station D2 receives the link channel assign denial message and does not perform outside line transmission.

In addition, if outside line communication and extension line communication are designated when a new personal station is registered in accordance with the registration procedure explained above (e.g., when a personal station B3 is registered into the base station A1), use of the new personal station is denied except for other purposes than the outside line communication and the extension line communication, and the new personal station comprising only necessary functions can thus be registered. (In this case, registration may be performed by replacing a personal station D2 with a personal station B3 in the example explained above.)

Figure 11:
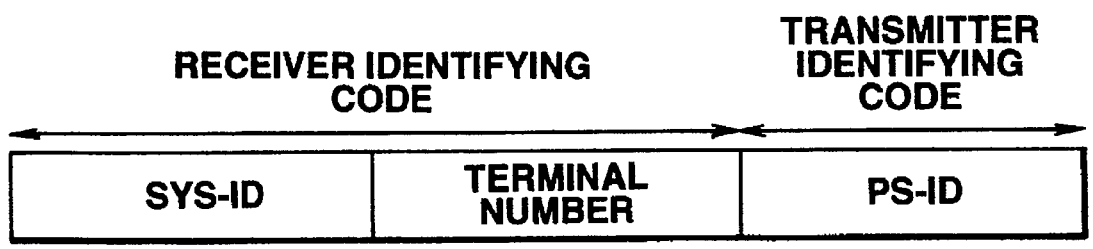
FIG. 11 is a figure showing the structure of identification data when transceiver communication is performed.

Meanwhile, if the personal station D2 is once registered as permitting only transceiver communication, transceiver communication is enabled by the CS-ID since the CS-ID of the base station A1 is registered into the personal station D2. That is, when transceiver communication is made between a personal station B1 and a personal station D2, for example, both of the personal stations are brought into a transceiver communication mode. Thereafter, as shown in FIG. 11, a receiver identifying code consisting of a terminal number of the personal station to be called and of the SYS-ID included in the CS-ID registered in the registered condition memory 31 is prepared, and a transmitter identifying code which is the PS-ID of the calling personal station itself is added to the receiver identifying code, so that channel connection is performed, thereby realizing transceiver communication.

In this way, when a personal station which temporarily belongs to another base station is registered, it is desirable to delete data registered under predetermined condition. Therefore, codes which are thus temporarily registered (e.g., the CS-ID or the like in case of the personal station D2) are deleted.

Figure 12:
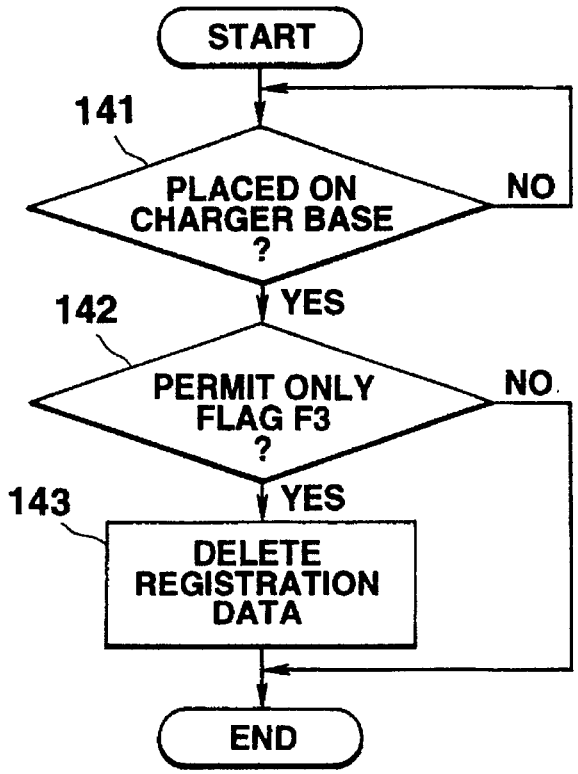
FIG. 12 is a flow chart showing a procedure for deleting a registration data in the radio communication system according to the first embodiment.

FIG. 12 is a operation flow chart showing a series of processing for deleting registration data relating to an expanded personal station registered in the manner explained above. In this example, when a personal station is attached to a charger base, registration data stored in the personal station is deleted.

Specifically, when a personal station D2 is attached to a charger base (not shown), a detection signal S1 is inputted into a CPU 21 from an attach/detach detecting circuit 35a and the CPU 21 thereby detects that the personal station D2 has been attached to the charger base (step 141). The CPU 21 thereby makes determination as to whether or not only the flag F3 (transceiver communication) of the terminal station D2 stored in the registered condition memory 31 of the personal station D2 is permitted (Step 142). Then, if only the flag F3 is thus permitted, a corresponding CS-ID, terminal number, terminal condition and group terminal number are deleted (step 143).

The above steps also apply to the case where the personal station B1 is attached to the charger base (not shown). In this case, the terminal number of the personal station D2 in the group terminal numbers is deleted. Further, a link with the base station A1 is formed, and the terminal number, PS-ID, and terminal condition of the personal station (e.g., the personal station D2) in which only the flag F3 of the terminal condition in the terminal data memory 9 of the base station A1 is permitted.

It is possible to make an arrangement such that registered personal station data is deleted when the personal station detects whether or not a CS-ID stored in the ID memory 32 has been received. Such an arrangement will be realized if the processing of the above step 141 is changed to "Is the CS-ID stored in the ID memory 32 has been received?".

Figure 13:
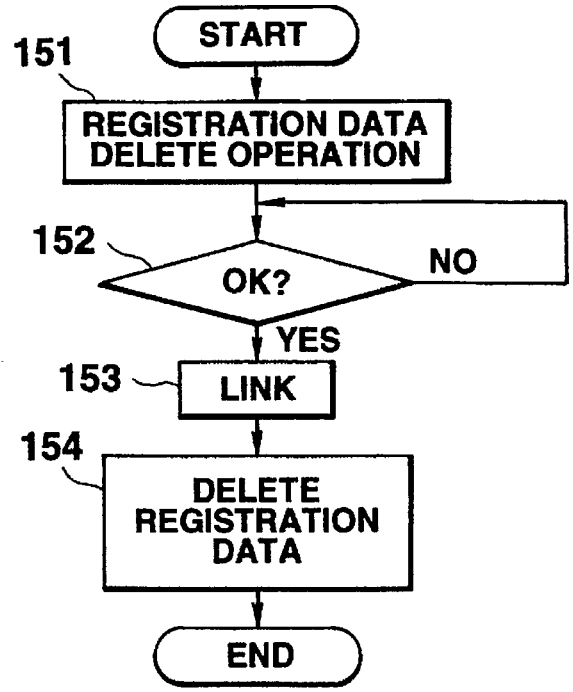
FIG. 13 is a flow chart showing another procedure for deleting a registration data in the radio communication system according to the first embodiment.

FIG. 13 is a flow chart showing another operation of processing for deleting data relating to an expanded personal station which has already been registered. In this example, data relating to the expanded personal station is deleted on the basis of key operation. As this kind of deletion method, there are two methods as follows. Since basic operations are common to both of the methods, these two methods will be explained with reference to the same figure.

(a) A personal station is brought into a registration mode again, and dial keys 30m of the key input unit 30 are operated so as to input, for example, "###" thereby inputting a terminal number of a personal station whose registration data should be deleted (step 151).

Thereafter, when a set key 30h is pressed down and an instruction of deletion is confirmed (step 152), the CPU 21 and the CPPU 22 form a registration data deletion message, thereby to form a link with the personal station designated by the inputted terminal number (step 153).

Then, registration data (a CS-ID, a terminal number, terminal condition, and a group terminal number) stored in a registered condition memory 31 of the personal station whose registration data should be deleted is deleted, and further, the terminal number of the personal station whose registration data should be deleted and which is stored in the registered condition memory 31 of the original personal station itself is deleted (step 154).

(b) The base station is brought again into a registration mode, and numerical keys 8d of the key input unit 8 are operated so as to input, for example, "###" thereby inputting a terminal number of a personal station whose registration data should be deleted (step 151).

Thereafter, a set key 8b is pressed down and an instruction of deletion is confirmed (step 152). Then, the CPU 1 and the CPPU 2 form a registration data deletion message, thereby to form a link with the personal station designated by the inputted terminal number (step 153).

Then, registration data (a CS-ID, a terminal number, terminal condition, and a group terminal number) stored in a registered condition memory 31 of the personal station whose registration data should be deleted is deleted, and further, the terminal number of the personal station whose registration data should be deleted and which is stored in the registered condition memory 31 of the base station is deleted (step 154).

Figure 14:
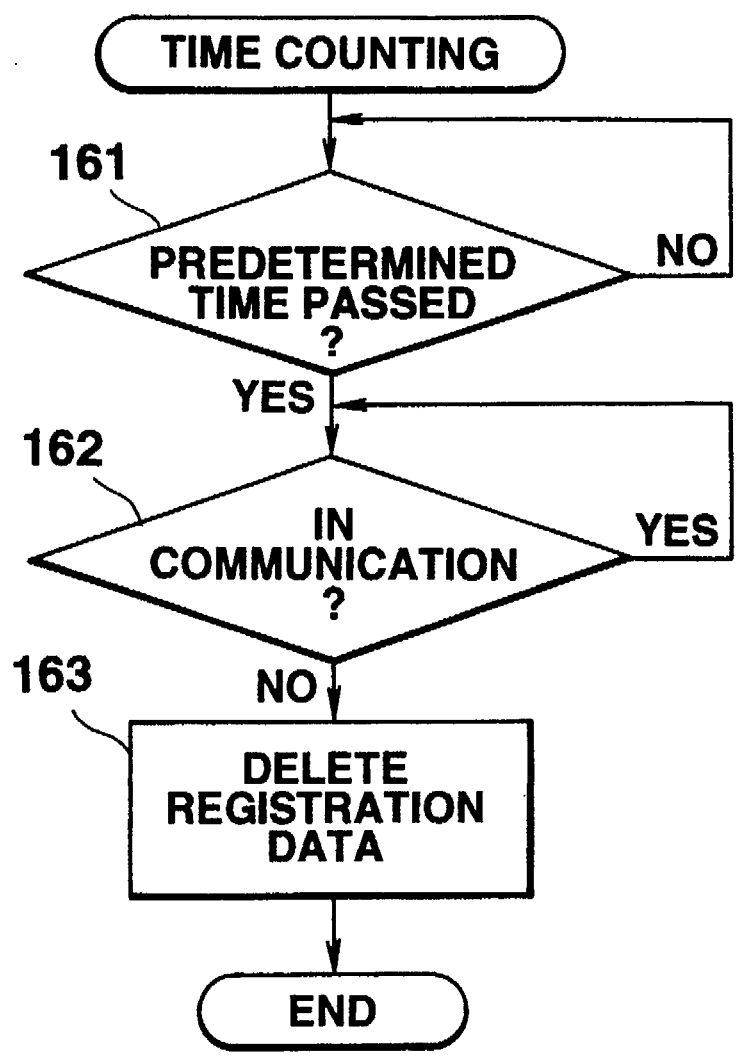
FIG. 14 is a flow chart showing further another procedure for deleting a registration data in the radio communication system according to the first embodiment.

FIG. 14 is an operation flow chart showing another example of processing for deleting registration data registered in a personal station of an expanded personal station D2. In this example, registration data is deleted after a predetermined time.

Specifically, the CPU 21 starts counting by a timer 21c of the personal station when a personal station is registered into a base station. Then, it is determined as to whether or not a predetermined time has passed, i.e., 24 hours have passed (step 161). If the predetermined time has passed, determination is made as to whether or not communication is being made. Then, if communication is not being made, registration data (a CD-ID, a terminal number, terminal condition, and a group terminal number) stored in the registered condition memory 31 of the registered personal station is deleted (step 162). Specifically, when communication is being made on the basis of temporarily registration data, registration data is deleted after communication.

Although determination as to whether or not a predetermined time has passed from the time of registration in step 161, it is possible to delete registration data of the personal station D2 by deleting registration data when date is updated, depending on whether or not data is changed in response to an output from the time keeper 21d. This structure is convenient when used for leisure purposes.

In the structure as stated above, for example, to enable transceiver communication between a personal station B1 or B2 registered in a base station A1 of a radio communication set T1 and a personal station (for example, D2) registered in a base station C1 of another radio communication set T2, the personal station D2 is registered in the base station A1 (where only the transceiver communication function is permitted). Further, even when the personal station D2 uses the base station A1 to perform outside line transmission in this state, the connection can be controlled under registered condition.

Therefore, undesirable connection to an outside line through the base station A1 of another radio communication set T1 can be prevented, so that it is advantageously possible to previously prevent unreasonable costs from being consumed for the base station A1. The same advantage can be obtained when extension transmission from the personal station D2 is performed, and therefore, a personal station D2 of another radio communication set T2 does not undesirably intervene into extension communication between personal stations B1 and B2 of the same radio communication set T1, so that unguarded tapping of communication can be prevented. In addition, since registration of service condition is permitted, depending on determination as to whether recitation numbers comply with each other, registration of service condition into the base station A1 of the personal station D2 can be prevented from taking place due to some unexpected reasons, and the safety of managing the system can be improved.

In addition, when transceiver communication is performed, registration data (the CS-ID and the like of the base station A1) stored in the registered condition memory 31 of an expanded personal station D2 is arranged so as to disappear on condition of end of communication, key input operation, or changes in a predetermined time and date and hour. In this manner, it is possible to make the right of transceiver communication between personal stations B1 and B2, which is registered in the base station A1 and is temporarily granted to the personal station D2, rapidly disappear.

EMBODIMENT 2

To carry out transceiver communication as explained above, it is required as a condition that personal stations must be registered in the same base station (i.e., personal stations must have a CS-ID of the same base station).

The second embodiments thus enables so-called transceiver communication, and shows a method of registering dummy base station identification data (i.e., the CS-ID stated above or only the SYS-ID) into a desired personal station. In this embodiment, the schematic structure of the radio communication system and the schematic structures of the base station and the personal station are the same as those shown in FIGS. 1 to 5. Therefore, these figures will be used to explain this embodiment.

Figure 15:
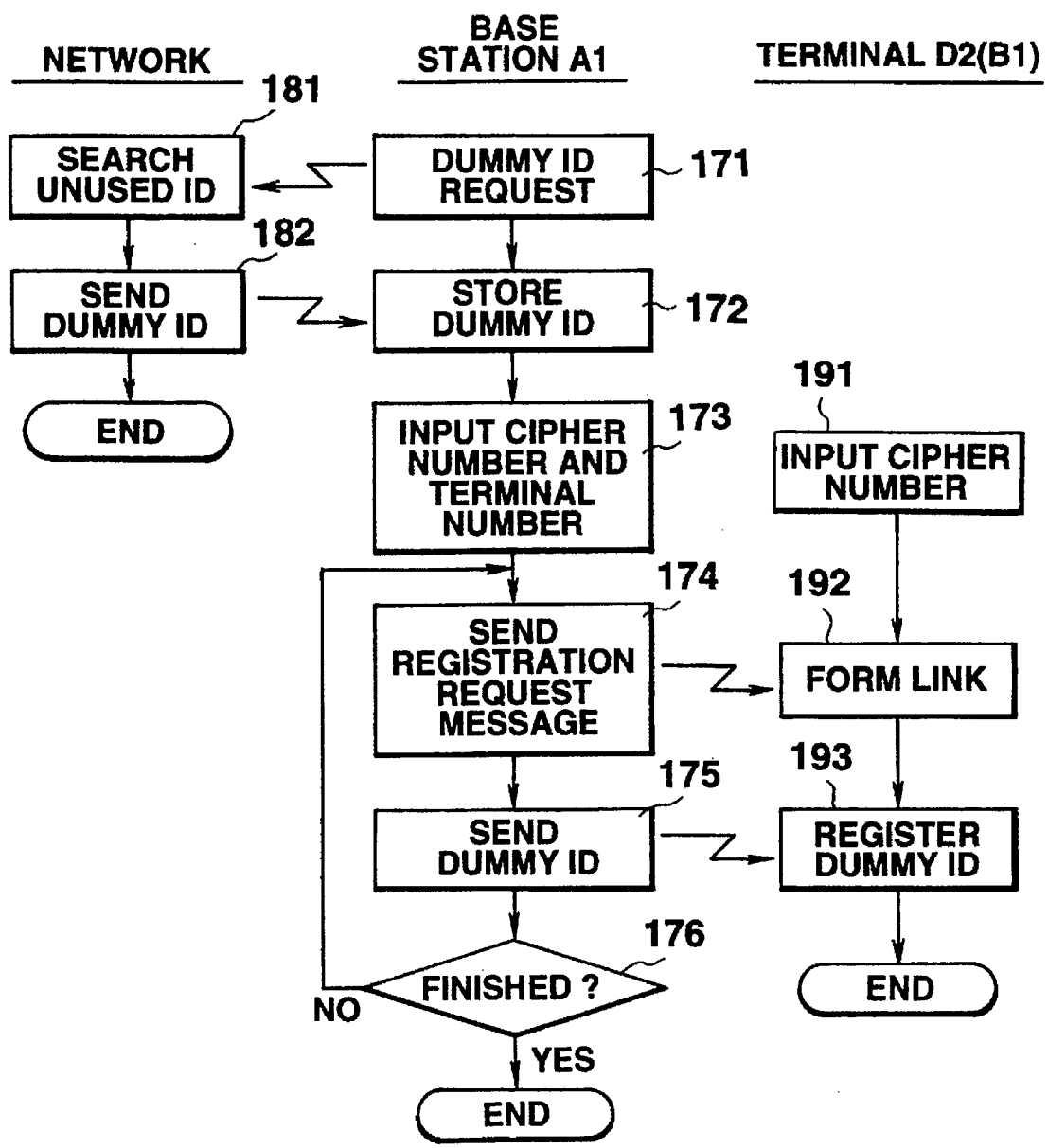
FIG. 15 is a flow chart showing a procedure for registering a dummy ID, according to a second embodiment of the present invention.

Further, operation of this kind of radio communication system will be explained with reference to a flow chart shown in FIG. 15.

In this case, after a user presses down a function key 8a of the key input unit 8 to bring the base station (A1) into a dummy code registration mode, request for a dummy ID is selected by a set key 8b (step 171). In response to the dummy ID, the CPU 1 prepares a connection request and dummy ID request message data, and sends the request and the data to a communication network from a network interface 5 through a communication line.

Then, in the network side, an unused dummy CS-ID (SYS-ID) is searched for in step 181. If an unused dummy CS-ID (SYS-ID) exists, the dummy CS-ID (SYS-ID) is sent to the base station which requests the dummy CS-ID (step 182). The base station receives a dummy CS-ID sent from the network side, and stores the dummy SYS-ID into a RAM 1b (step 172).

Further, a message suggesting an input of a cipher number and the number of personal stations whose dummy CS-IDs are to be registered is displayed on the display of the base station. In response to the message, numerical keys 8d of the key input unit 8 are pressed down and the cipher number and the number of personal stations are inputted (steps 173 and 174) and stored into a RAM 1b. In this state, terminal numbers corresponding in number to the inputted number of personal stations are prepared and are stored into the RAM 1b.

In the next, a function key 30f of the key input unit 30 of the personal station (B1) whose dummy code should be registered is operated thereby to bring the base station into a dummy code registration mode, and then, a message suggesting an input of a cipher number is displayed on the display 33a of the display unit 33. When numerical keys 30m are operated and a cipher number is inputted in response to the message, the cipher number is stored into the RAM 21b (step 191).

When registration keys 8b of the key input unit 8 of the base station is then operated, the CPU 1 prepares a dummy code registration request message with using the cipher number stored in the RAM 1b, as identification data, like registration operation of the first embodiment. Then, the dummy code registration request message is outputted to a personal station (step 174).

A personal station receives the dummy code registration request message, and confirms the cipher number included in the identification and the cipher number stored in the RAM 21b. When recognition is completed, a link is formed (step 192).

Further, a predetermined terminal number is selected from terminal numbers stored in the RAM 1b of the base station A1, and then, a dummy ID, a terminal number, and another terminal number (i.e., a group terminal number) are sent (step 175).

A personal station receives the dummy ID, terminal number, and group terminal number, and stores then into the registered condition memory 31 (step 193). Next, in the base station A1, whether or not a deletion key 8c of the key input unit 8 is pressed down is determined (step 176). If the deletion key 8c is pressed down, the step goes to an end. If the deletion key 8c is not pressed down, a link with the next personal station (D2) is formed, and steps 174, 191, 174, 175, 192, and 193 are carried out sequentially in this order, thereby achieving registration.

In this manner, if a dummy ID is registered into a plurality of personal stations from the base station, transceiver communication between personal stations is enabled by the dummy ID. Specifically, for example, when transceiver communication should be made between a personal station B1 and a personal station D2, both of the personal stations are brought into a transceiver communication mode. Next, which CS-ID of the CS-IDs (or SYS-IDs) stored in the ID memory 32 or the registered condition memory 31 should be used is selected. When a terminal number which a user would like to call is designated by one of the personal stations, identification data is prepared on the basis of the selected CS-ID and the terminal number, and channel connection is attained in a predetermined procedure, thereby realizing transceiver communication.

In addition, explanation of this second embodiment has been made to a method of registering a dummy ID (CS-ID) into a plurality of personal stations which permit transceiver communication. However, the present invention is not limited to this method. For example, ID memories each storing a dummy ID, a terminal number, and a group terminal number may be provided in the personal stations such that these ID memories are detachable therefrom, independently from the ID memories respectively included in the terminals. These ID memories are respectively attached to the personal stations, thereby making it possible to directly register the dummy ID.

Figure 16:
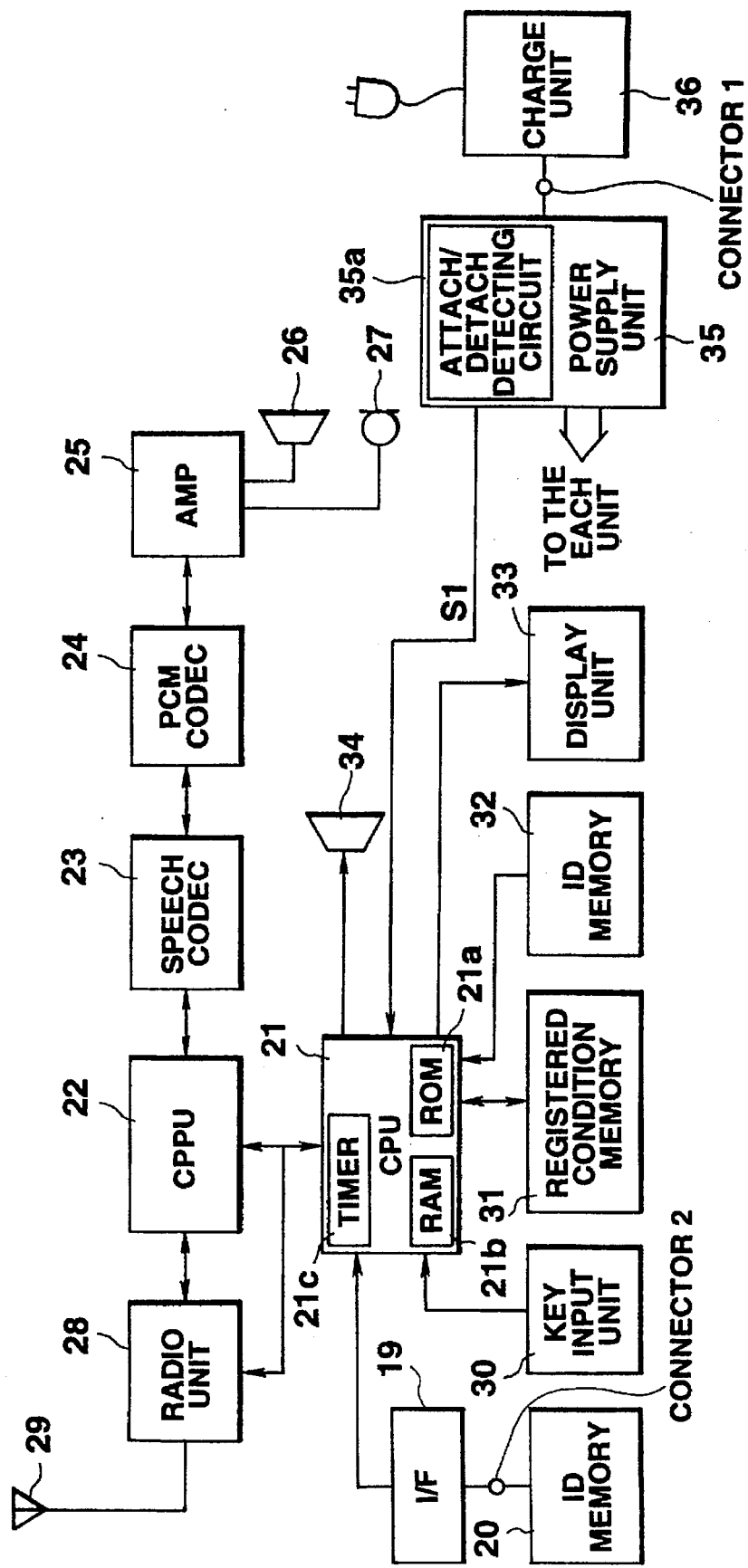
FIG. 16 is a block diagram showing the circuit configuration of a radio communication terminal used for another method of registering a dummy ID according to the second embodiment.

FIG. 16 shows a schematic structure of a personal station to which a detachable ID memory can be attached. Note that the same portions as those in FIG. 5 are denoted by the same references.

Figure 17:
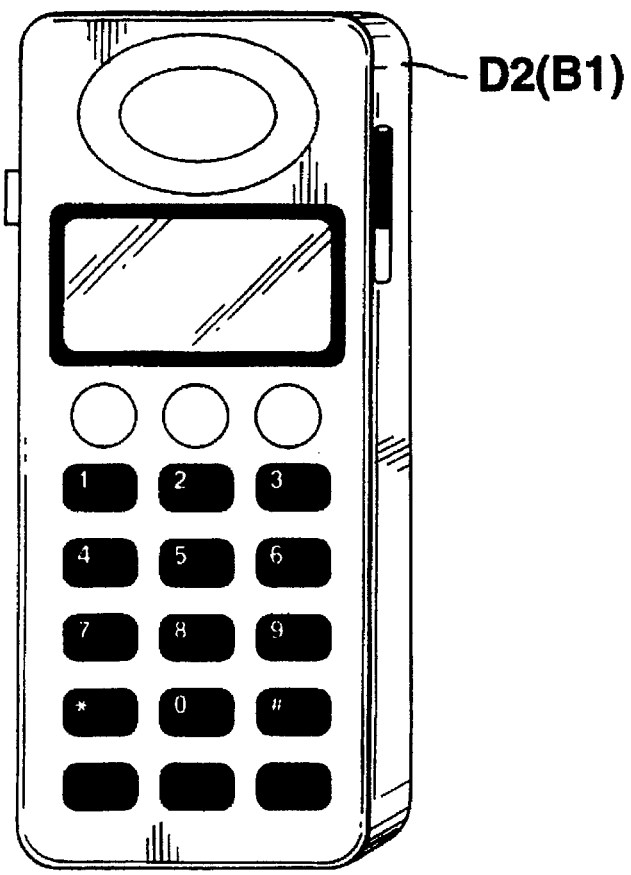
FIG. 17 is a figure explaining the concept of another method for registering a dummy ID according to the second embodiment.
Figure 17:
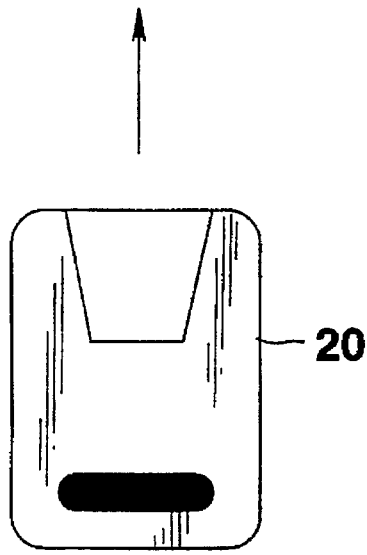

In this case, the personal station is constructed such that an ID memory 20 can be connected to the CPU 21 through an interface 19. The ID memory 20 has, for example, a card-like shape as shown in FIG. 17. Other than the one memory having a card-like shape, a memory having a chip-like or cassette-like shape may be used.

At least a dummy CS-ID (or SYS-ID), the terminal number of a personal station, and the terminal numbers (or group terminal numbers) of other personal stations are stored in the ID memory 20. In addition, various data such as telephone numbers of members, cipher numbers, and optional service contracts may be stored. Further, a plurality of such ID memories 20 having the same CS-ID and the likes may be manufactured. A user buys such ID memories 20 and attaches them to personal stations which the user would like to use for transceiver communication, thereby enabling transceiver communication.

FIG. 17 shows a state in which an ID memory 20 is being attached to a personal station. If only ID memories 20 which store dummy CS-IDs and the likes are attached to a plurality of personal stations which a user would like to use for transceiver communication at a user's destination of a trip or the like, the same dummy CS-ID can be registered into these personal stations. In this manner, it is possible to easily realize direct communication between personal stations, i.e., so-called transceiver communication.

In addition, the present invention is not limited to the above embodiments, but may be modified and changed without deriving from the subject matter of the invention. For example, in the first embodiment, a CS-ID and the like of a base station are set into an expanded personal station by performing registration into another base station. Otherwise, a CS-ID and the like may be set from a personal station into which a CS-ID of a base station has been registered. In this case, since a PS-ID of an expanded personal station is not registered into a base station which has a CS-ID set in an expanded personal station, only transceiver communication can be achieved.

Figure 18:
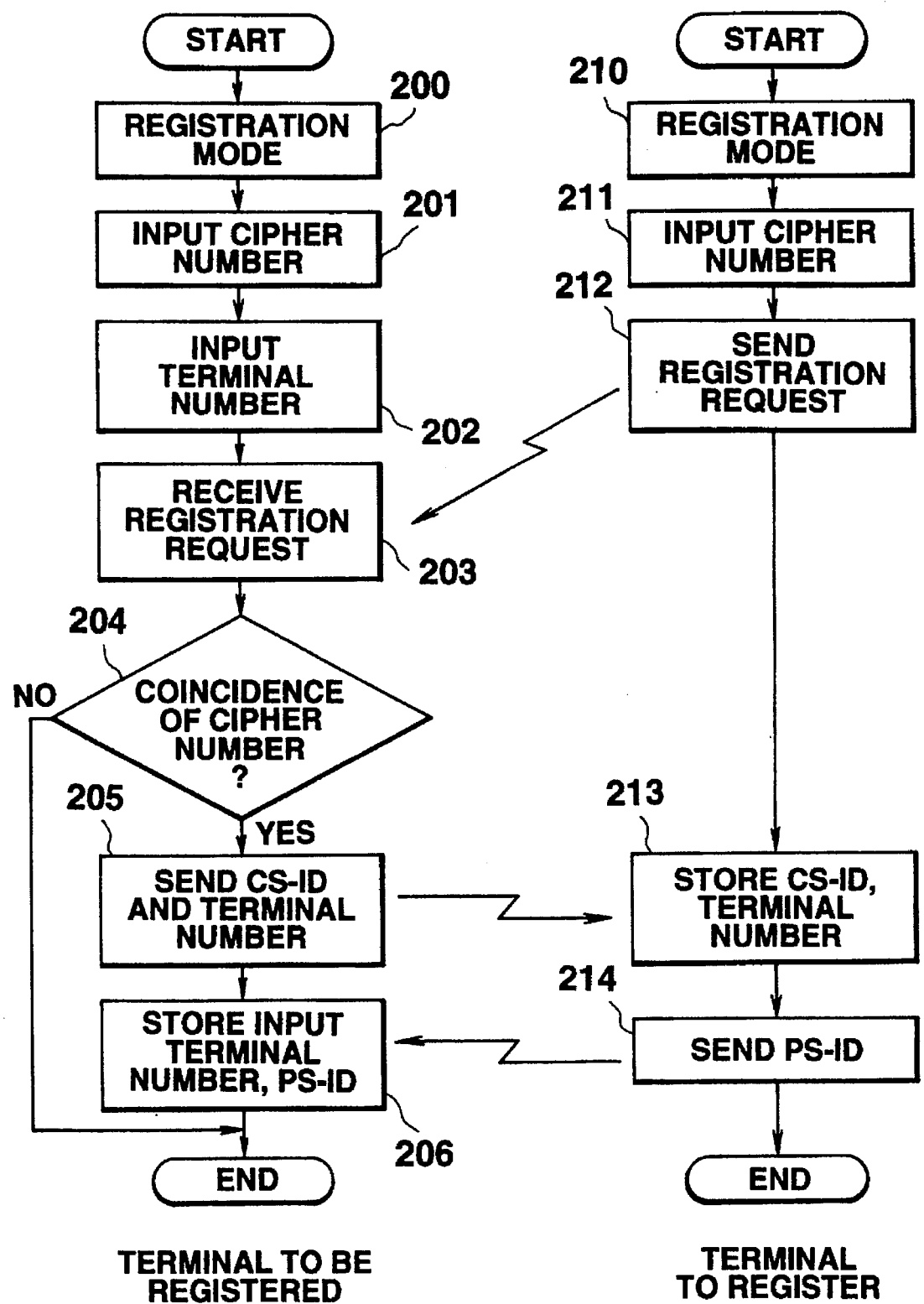
FIG. 18 is a flow chart showing a registration procedure of another embodiment according to the first embodiment.

The registration method in the above case is basically similar to the first embodiment (i.e., when registration is performed to a base station). As shown in FIG. 18, a personal station to be expanded and a personal station to expand are brought into a registration mode (steps 200 and 210), and cipher numbers are respectively inputted into the stations (steps 201 and 211). Further, in the side of a personal station to be registered, a terminal number to register is inputted (step 202), and a registration request from the personal station to register is waited.

Next, like in the above first embodiment, a registration request message using identification data as a cipher number is sent from the personal station to register (step 212). The personal station to be registered receives the registration request message (step 203), and a recitation number is extracted from the message. Confirmation as to whether this cipher number complies with the cipher number inputted in the step 201 (step 204). If these cipher numbers comply with each other, the CS-ID registered in the personal station to be expanded, the terminal number (or group terminal number) of itself, and the terminal number of the personal station to register, which is inputted in step 202, are sent to the personal station to expand (step 205). The personal station to register receives these numbers and stores then into a registered condition memory 31 (step 213). Further, the personal station to register sends a PS-ID of itself to the personal station to be registered (step 214). The personal station to be expanded receives the PS-ID of the personal station to register and stores the PS-ID into the registered condition memory 31 (step 206).

Registration operation is thereby completed. In this manner, the CS-ID (SYS-ID) of the same base station and identification data of the other personal stations are stored. With use of the identification data and identification code of FIG. 11, transceiver communication is enabled.

In addition, if outside line communication is requested from the personal station to expand with use of a newly registered CS-ID, communication can be attained since the PS-ID of a personal station to expand is not registered into a base station and therefore, a connection with a base station cannot be achieved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of registering a terminal in a base station of a radio communication system, the radio communication system comprising a base station having a system code, and a plurality of terminals, each of said plurality of terminals having a terminal code, said method including steps executed in the base station as well as steps executed in a registering terminal, said method comprising the steps of:
    a) transmitting the system code from the base station to the registering terminal;
    b) receiving the base station system code at the registering terminal;
    c) registering the system code in the registering terminal;
    d) transmitting the terminal code from the registering terminal;
    e) receiving the terminal code at the base station; and
    f) registering the terminal code in the base station in conjunction with data to be transmitted in a peer-to-peer mode;
    wherein the registering terminal utilizes the registered system code to communicate in peer-to-peer mode with another terminal having substantially the same system code registered therein.

2. A method according to claim 1, wherein said system code registered in the registering terminal is deleted by completing communication in peer-to-peer mode.

3. A method according to claim 1, wherein said system code registered in the registering terminal is deleted when it is determined that the registering terminal is placed on a charger base for charging the terminal.

4. A method according to claim 1, wherein said system code registered in the registering terminal is deleted by an operation from the base station or another terminal when communication in peer-to-peer mode is completed.

5. A method according to claim 1, wherein said system code registered in the registering terminal is deleted after a predetermined quantity of time has elapsed or when a date is changed.

6. A method of registering a terminal in a base station of a radio communication system, the radio communication system comprising a base station having a system code and a plurality of terminals, each of said plurality of terminals having a terminal code, said method including steps executed in the base station as well as steps executed in a registering terminal, said method comprising the steps of:
    a) transmitting cipher data provided by a user from the registering terminal to the base station;
    b) receiving the cipher data from the registering terminal at the base station;
    c) transmitting, when the cipher data from the registering terminal coincides with cipher data of the base station, a system code from the base station to the registering terminal;
    d) receiving the system code from the base station at the registering terminal;
    e) registering the system code in the registering terminal;
    f) transmitting the terminal code of the registering terminal to the base station;
    g) receiving the terminal code from the registering terminal in the base station; and
    h) registering the received terminal code in conjunction with data to be transmitted in peer-to-peer mode;
    wherein the registering terminal utilizes the registered system code to communicate in peer-to-peer mode with another terminal having substantially the same system code registered therein.

7. In a radio communication system comprising a plurality of terminals each having a corresponding terminal code, and a base station having a system code and a registration mode in which at least one of the plurality of terminals is registered thereto, at least one of the plurality of terminals to be registered in said base station, so as to enable communication in peer-to-peer mode with another terminal registered in said base station, sending a corresponding terminal code to the base station, said base station comprising:
    instruction means for providing an instruction signal to set a registration mode;
    registration mode setting means for setting the registration mode substantially subsequent to receipt of the instruction signal;
    sending means for, when the registration mode is set by said instruction means, sending the system code to one of the plurality of terminals to be registered;
    receiving means for receiving a corresponding terminal code provided by the terminal to be registered; and
    registering means for registering the terminal code received by said receiving means together with data which enables the terminal being registered to communicate in peer-to-peer mode with another terminal registered in said base station, and which data inhibits the terminal having the registered terminal code from communication via said base station.

8. A radio communication system according to claim 7, further comprising:
    means for instructing deletion of registration data relating to the terminal; and
    first deleting means for deleting registration data relating to the terminal when deletion of registration data is requested by the instructing means.

9. A radio communication system according to claim 7, further comprising;
    second deleting means for deleting registration data relating to the terminal after a predetermined quantity of time has elapsed or when date is changed.

10. In a radio communication system comprising a plurality of terminals each having a corresponding terminal code, and a base station having a system code, cipher data, and a registration mode in which at least one of the plurality of terminals is to be registered thereto, at least one of the plurality of terminals to be registered in said base station, so as to enable communication in peer-to-peer mode with another terminal registered in said base station, sending cipher data to the base station which is substantially the same as the cipher data of the base station, said base station comprising:

instruction means for providing an instruction signal to set a registration mode;

registration mode setting means for setting the registration mode substantially subsequent to receipt of the instruction signal;

first receiving means for receiving cipher data provided by a terminal to be registered;

sending means for, when the cipher data received by said first receiving means substantially coincides with the cipher data of said base station, sending the system code to the terminal to be registered;

second receiving means for receiving a terminal code, which the terminal to be registered provides in response to the system code sent by said sending means, from the terminal to be registered; and registering means for registering the terminal code received by said second receiving means together with data for allowing the terminal to be registered to communicate in peer-to-peer mode with another terminal registered in said base station.

11. In a radio communication system comprising a base station and a plurality of terminals, said base station comprising:

first memory means for storing a system code used to communicate via the base station and a false system code used to communicate in peer-to-peer mode which does not communicate via the base station; and false system code sending means for sending the false system code stored in said first memory means upon request of a user; and wherein each of said plurality of terminals comprises:

second memory means for receiving and storing the false system code sent from said base station; and communicating means for communicating with a terminal having substantially the same false system code stored therein in peer-to-peer mode by using the false system code stored in said second memory means.

12. A radio communication system according to claim 11, wherein said base station has means for obtaining the false system code from outside, and means for storing the false system code obtained by the obtaining means within said first memory means.

* * * * *